Patented Sept. 25, 1945

2,385,739

UNITED STATES PATENT OFFICE 2,385,739

MOLDING COMPOSITION COMPRISING VERY PLASTIC POLYMERS OF CHLOROPRENE AND THE LIKE

Howard W. Starkweather, New Castle County, Del., and Frank N. Wilder, Woodstown, N. J., assignors to E. I. du Pont de Nemours & Company, Wilmington, Del., a corporation of Delaware No Drawing. Application June 1, 1940, Serial No. 338,382

15 Claims. (Cl. 260—23)

This invention relates to molding compositions, molding processes, and the products thereby produced. More particularly, it relates to elastic, highly distensible, molded articles made from extremely plastic polymers of elastogenic materials.

The prior art method for making shaped articles from undispersed natural or synthetic rubber, in general, involves molding or otherwise forming a plastic composition under a very considerable pressure followed by curing by heat, again in most cases in a mold under pressure. This method has the disadvantages that much power and labor are consumed in converting the plastic material to the desired shape and that expensive molds are required to withstand the high pressures and temperatures. Moreover, it is extremely difficult or impossible, by the methods now available, to form elastic, rubber-like materials within cavities, such as cracks and expansion joints in concrete, in such a way that they completely occupy the cavity and act as a bond or filling.

It is an object of this invention to discover molding compositions capable of being molded and cured to produce elastic, highly distensible, molded articles. Another object is a molding process for producing such articles without the use of above atmospheric pressure. A further object is the production of elastic, highly distensible, molded articles. A still further object is the articles so produced. Other objects will become apparent hereinafter.

These objects have been accomplished by the discovery that highly plastic or fluid, polymeric derivatives of elastogenic materials having sulfur in chemical combination, made by polymerizing said elastogenic materials in the presence of sulfur, and then plasticizing them to a plasticity number of from 0 to 30, may be molded at a pressure not exceeding substantially atmospheric pressure and cured to form elastic, highly distensible articles.

The term "elastogenic," as used throughout this application, means capable of forming rubber-like materials. Any elastogenic material is usable in making the molding composition of the present invention. The preferred materials are elastogenic dienes such, for example, as butadiene, chloroprene, bromoprene, and their methyl homologues such as isoprene and methyl chloroprene. Especially preferred are chloroprene (chloro-2-butadiene-1,3) and butadiene-1,3. Interpolymers of these materials with each other or with other materials may be used, such, for example, as chloroprene and cyanoprene, chloroprene and acrylic nitrile, butadiene and styrene, butadiene and methyl methacrylate, butadiene and methacrylic nitrile, etc.

Several methods are known for converting these elastogenic materials into polymeric derivatives having the desired plasticity numbers. It has been discovered, however, that only those materials which have been prepared by polymerizing in the presence of sulfur followed by the plasticizing treatment discussed below, are suitable for practicing the present invention. Materials made by the other methods, when fluid enough to form compositions which are readily poured into molds, cure much more slowly than the preferred polymers and give products of inferior rubber-like properties.

It has been found that the polymeric derivatives above described may be plasticized to a plasticity number below 30 without losing the property of being curable to strong elastic articles. The term "plasticity number" is used throughout this application to refer to the thickness in thousandths of an inch of a sample 2.5 cc., in volume, which has been heated at 80° C. for 15 minutes while maintaining it in approximately spherical form, and then kept under a weight of 5 kilograms for 3 minutes at 80° C. Thus, the lower the "plasticity number," the greater is the plasticity. Very plastic and fluid polymeric derivatives of the class herein described, having a plasticity number between 0 and 30, can be used in the present invention. Those having a plasticity number of from 5 to 15 are preferred. Those having a plasticity number of from 10 to 12 are especially preferred. With plasticities below the preferred values, there is a progressive decrease in superiority of the cured product. Moreover, as the polymeric derivatives become less and less viscous, it becomes more and more difficult to incorporate into them compounding ingredients such as zinc oxide, magnesium oxide, carbon black, etc. When plasticity numbers above the preferred values are encountered, fluidity is progressively reduced until difficulty is encountered in making the molding composition take the shape of the mold without increased pressure.

The polymeric derivatives of elastogenic materials within the scope of the present invention are preferably made by polymerization of the elastogenic material in emulsion in the presence of sulfur. Emulsifying agents, antioxidants, agents for controlling polymerization rate, etc., may be used all as in known practice of the art.

Although not preferred, massive or solution polymerization may be used.

These polymers, made in the presence of sulfur, are not plastic enough for the purpose of this invention as first made; in fact, they are often elastic, relatively non-plastic materials. A preferred method of plasticizing these materials comprises adding to them a compound of the formula R—S—R₁, wherein R is a member of the group consisting of alkyl, aryl, thiazyl, thiocarbamyl, xanthogenyl, thioxanthogenyl, aromatic acyl, and aromatic thioacyl radicals, and R₁ is a member of the group consisting of hydrogen, base-forming radicals, and radicals represented by —S$_n$—R₂ in which $n$ is a whole number less than 4 and R₂ is one of the group represented by R above, and then subject them to plasticizing conditions, such as aging, heating, milling, or a combination of these. Moreover, amines which give bases with dissociation constants greater than $10^{-6}$ may also be added. This preferred method of plasticizing is disclosed and claimed per se with reference to chloroprene polymers in the copending application of Youker, Serial No. 264,581, filed March 28, 1939, and is disclosed and claimed per se with reference to polymers of butadiene and similar materials in the copending application of Starkweather and Youker, Serial No. 264,582, filed March 28, 1939, to which reference is here made for further details.

In order that the process of preparing the polymeric materials suitable for the present invention may be more fully understood, the following processes are set forth in detail by way of illustration using chloroprene as an example, but it is to be understood that the process is not limited to such illustration.

Process A

One and five-tenths (1.5) parts of sulfur was dissolved in 100 parts of chloroprene by first dissolving the sulfur in 3 parts of a chlorinated naphthalene having a melting point of 90° C. to 95° C. at 125° C. and stirring this hot solution into the chloroprene in which 4 parts of wood rosin had already been dissolved at 40° C. This solution was then emulsified in 233 parts of water containing 0.5 part of ammonium persulfate, 0.5 part of the sodium salts of the dinaphthylmethane sulfonic acids prepared according to U. S. Patent No. 1,191,485 and 0.8 part of sodium hydroxide. The resulting disperison was then maintained at 40° C., by cooling and heating as necessary, until the density reached 1.050. At this point, the dispersion was treated with 1 part of phenyl-beta-naphthylamine dispersed in sodium abietate solution, neutralized with acetic acid, and coagulated in the form of a continuous sheet as described in the U. S. Patent No. 2,187,146 to Calcott and Starkweather, by freezing it in a thin layer on the surface of a rotating, internally cooled drum, allowing the thin layer to remain in contact with the freezing surface for a length of time such that, on removing the film from the drum and allowing the ice therein to melt, a continuous sheet of completely coagulated material remained. The sheet was then washed by passing it under sprays of water while supported on a moving belt and dried by passage through a chamber through which air heated to 80° C. was passing. Four per cent of tetramethyl thiuram disulfide was then incorporated into the dry polymer by milling and the product was then ready for storage or shipment. The final step in the preparation of a fluid polymer was carried out by incorporating 2 per cent of diorthotolyl guanidine by milling and allowing the product to stand for 24 hours. It was then fluid and ready for use as in the examples given below. The plasticity number, as determined by the apparatus of Williams, was approximately 10.

Process B

A polymer was prepared according to the process of Process A except that 2 per cent of sulfur was used. The product thus produced had a plasticity number of approximately 5.

Process C

A polymer was prepared according to the process of Process A except that 2 per cent of tetramethyl thiuram disulfide and 2 per cent of diorthotolyl guanidine were used. The product had a plasticity number of approximately 12.

In order to practice the present invention, the very plastic or fluid materials above disclosed are suitably compounded, molded, and cured. By way of illustration, the following examples are given, but the invention is not limited thereto as will become more apparent hereinafter.

Example I

One hundred (100) parts of the fluid polymer prepared according to Process A above is mixed in an internal mixer with 4 parts of light calcined magnesia, 5 parts of zinc oxide, 10 parts of blown caster oil, 40 parts of paraffin oil and 25 parts of factice. This fluid composition is then poured into a mold which consists of an upright cylinder with a steel rod at its axis, closed at the bottom, but open at the top. Both the mold and the composition being cast are at 80° C. The filled mold is then closed and subjected to a temperature of 153° C. for 30 minutes. Upon removing the outer cylinder, a formed article, containing a steel axle and suitable for use as a printing roll, results.

Example II

A fluid composition is made as described in Example I except that the fluid polymer was prepared according to Process B. The resulting fluid composition is poured at 80° C. into a mold consisting of two parts enclosing a spherical cavity surmounted by a cylindrical cavity of relative small diameter (i. e., a gate). Enough of the composition is poured to fill the spherical cavity and extend beyond it into the cylindrical cavity. The mold and its contents are then heated at 153° C. for 30 minutes. Upon removing the mold and cutting off the cylindrical part (the sprue), a resilient and elastic ball is obtained.

Example III

One hundred (100) parts of a polymer prepared according to Process A is mixed in an internal mixer with 50 parts of a chlorinated naphthalene having a melting point of 90° C. to 95° C., 5 parts of zinc oxide, and 4 parts of magnesium oxide. The lower end of a tube 0.75 inch internal diameter is placed in the composition and the tube is filled by the application of suction to the upper end thereof. The composition is cured by subjecting the tube to a temperature of 153° C. for 30 minutes. The product, when removed from the tube or mold, was an elastic, highly distensible rubber-like article.

Example IV

One hundred (100) parts of the fluid polymer prepared according to Process A above is mixed as in the above example with 4 parts of magnesia, 5 parts of zinc oxide, 25 parts of a chlorinated naphthalene having a melting point of 90° C. to 95° C. and 10 parts of factice. This composition, when cast in the form of a printing roll, as in Example I, and cured as described therein, gives a similar, but somewhat harder product.

Example V

One hundred (100) parts of the product made according to Process A above is mixed in an internal mixer with 4 parts of magnesia, 5 parts of zinc oxide, and 100 parts of a paraffin oil containing a considerable proportion of naphthenes. This very fluid composition may be poured at 80° C. into a mold having the shape of an animal or other toy. After curing at 153° C. for 30 minutes and removing the mold, a toy made from the rubber-like composition results.

Example VI

One hundred (100) parts of the product of Process A, 4 parts of magnesium oxide, 5 parts of zinc oxide, 35 parts of paraffin oil, 20 parts of factice and 20 parts of cotton seed oil are mixed as in the above examples, heated to 80° C., poured into a mold, and cured for 30 minutes at 153° C. The product is similar to that of Example I, but, because of the presence of the cotton seed oil, it has the advantage that none of the oils used in its preparation show a tendency to collect on the surface of the article after curing.

Example VII

One hundred (100) parts of the product of Process A is mixed with magnesium and zinc oxides as in the preceding examples and with 50 parts of chlorinated naphthalene with a melting point of about 90° C. to 95° C. and 10 parts cotton seed oil and cast and cured as above. The cotton seed oil prevents the chlorinated naphthalene from blooming; that is, separating on the surface of the finished article.

The preferred casting compositions are homogeneous mixtures of the polymeric material and a non-volatile flux, such mixtures containing curing accelerators; that is, in order to be sufficiently fluid to be easily poured, the casting compositions should contain a non-volatile flux and the polymeric material. The term "non-volatile flux" includes all materials which, at the temperature at which the composition is cast, are substantially non-volatile and capable of forming homogeneous mixtures with a polymeric material in the uncured state. Thus, these fluxes may be either solids or liquids at ordinary temperature and may even be solids at the casting temperature (as illustrated by the chlorinated naphthalene in the examples) since mixtures with the polymers of the concentrations used often have considerably lower melting points than the flux alone. Examples of the preferred substances which may be used are mineral oils, fatty oils, and low-melting natural and synthetic waxes, resins, asphalts, pitches, etc. Some of these fluxes remain fluid in the finished product and others solidify. Those of the first type, for example, mineral oils and fatty oils, are, therefore, used when a very soft final product is desired, while those which solidify are useful for obtaining the maximum increase in fluidity of the casting composition combined with maximum hardness of the finished article. Examples of the latter type are chlorinated hydrocarbons melting between about 25° C. and 153° C. The hydrocarbons chlorinated may be paraffin, benzene, diphenyl, naphthalene, etc. One preferred compound is the chlorinated naphthalene of melting point, 90° C. to 95° C., used in the examples. Mixtures of the two types of fluxes or of different fluxes of the same type may, of course, be used. The preferred fluxes of the permanently liquid type, particularly when other types of flux are used as well, are the fatty oils such as cotton seed oil, fish oil, castor oil, linseed oil, etc. These, as already discussed, give very soft products, and, in addition, prevent other fluxes, such as mineral oils and chlorinated naphthalenes, from appearing on the surface of the finished articles.

While the invention is not limited to any particular proportions of ingredients, it is preferred to use a composition comprising a curing accelerator, 25 to 100 parts of a non-volatile flux and 100 parts of a polymeric derivative of an elastogenic material having a plasticity number of from 0 to 30 and prepared by polymerizing the elastogenic material in the presence of sulfur. These proportions have been found to give especially good results in making various types of molded products.

In addition to the compounding ingredients discussed above for increasing the fluidity of the casting compositions and increasing the softness of the cured products, any of the other materials added to natural or synthetic rubber in order to alter their properties may be used in the present invention. The conventional agents may be added for coloring, filling, reinforcing and altering the density, although it should be noted that large amounts of such agents are usually undesirable, since they reduce the fluidity of the casting composition. Compounds such as ammonium carbonate or compounds which react to form it may be added to form a porous or sponge-like structure. Factice and similar rubber-compounding ingredients may be used to advantage in some cases as illustrated in the above examples.

The filling of the mold or cavity may be carried out over a wide range of temperature, the essential requirement being that the temperature is sufficiently high for the composition to flow readily. Any temperature up to that at which curing starts to have a substantial effect may be used. A temperature range of 20° C. to 153° C. is suitable and a range of 70° C. to 90° C. is preferred. Increase in temperature increases the fluidity, and, therefore, the ease of casting. On the other hand, as the temperature is increased, particularly above 120° C., the curing of the compounded material proceeds so rapidly that special precautions must be taken to avoid premature curing. Even the first signs of the curing process, which starts as an increase in the viscosity of the fluid, would defeat the purpose for which the temperature was originally raised. It is still possible to work at these higher temperatures by heating just enough material for casting one article at a time and by introducing it at once into the mold, but this method is not adapted to convenient production, and, therefore, is not preferred. It will, thus, be seen that the temperature as well as the plasticity of the starting material is critical.

The fluidity may also be increased, as described above, by the introduction of oils and similar liquids, but may also be increased by further treating the polymer by the methods used in the Youker application to increase plasticity.

The temperature and time of curing are subject to the same variations already known in the art for the plastic polymers of elastogenic materials. Catechol is particularly useful for bringing about the curing at low temperature, as, for example, when the casting composition is used as a permanent filling in cavities such as the expansion joints or cracks in concrete or in cavities formed in tree surgery.

The molds used for casting need not be of the same heavy construction as is required for forming rubber-like objects from plastic compositions by the conventional methods, but may be made of wood, synthetic resins, plaster of Paris, glass, etc., as well as of metal. The inner surface of the mold which comes in contact with the fluid composition may be treated in any of the ways known to the art for preventing rubber-like materials from adhering, such as coating with soap. It is sometimes more convenient, instead of allowing the composition to flow into the mold, to evacuate the mold and allow the composition to enter through a hole at the bottom.

The uses of the invention include both the formation of isolated formed objects as described in the examples and the permanent filling of cavities, as, for example, the filling of cracks and joints in concrete, stone, glass, wood, and similar materials, as in the setting of blocks and bricks, the repair of floors and pavements, the sealing of fissures, the caulking of ship bottoms, vats, barrels, etc., and the application to tree surgery mentioned above. Some of the advantages of the present process for making formed articles are the cheapness and ease of construction of the molds and the intricate nature of the objects which may be made. The present invention also furnishes the first method for satisfactorily filling cracks and cavities with an elastic water-proof and permanent composition.

In addition to the advantages of the processes discussed above, the final products themselves are much superior to those made from other mixtures. Thus, the compositions of the present invention may be cast as readily as glue glycerine in making printing rolls and give products which have the resiliency and resistance to the action of inks which are necessary for the purpose, but, in addition, the finished products have greater strength and greater tear resistance and are only slightly effected by changes in temperature and humidity which have a highly undesirable effect upon the glue glycerine compositions.

It is apparent that many widely different embodiments of this invention may be made without departing from the spirit and scope thereof, and, therefore, it is not intended to be limited except as indicated in the appended claims.

We claim:

1. A composition for molding rubber-like articles which comprises a curing accelerator and a polymeric derivative obtained by polymerizing an elastogenic, aliphatic, conjugated diene in the presence of sulfur and plasticizing the polymer until it has a plasticity number of from 0 to 30.

2. A composition for molding rubber-like articles comprising a curing accelerator, a non-volatile flux, and a polymeric derivative obtained by polymerizing an elastogenic, aliphatic, conjugated diene in the presence of sulfur and plasticizing the polymer until it has a plasticity number of from 0 to 30.

3. A composition for molding rubber-like articles which comprises a curing accelerator, 25 to 100 parts of a non-volatile flux, and 100 parts of a polymeric derivative obtained by polymerizing an elastogenic, aliphatic, conjugated diene in the presence of sulfur and plasticizing the polymer until it has a plasticity number of from 0 to 30.

4. A composition for molding rubber-like articles which comprises a curing accelerator and a polymeric derivative obtained by polymerizing chloro-2-butadiene-1,3 in the presence of sulfur and plasticizing the polymer until it has a plasticity number of from 0 to 30.

5. A composition for molding rubber-like articles comprising a curing accelerator, a non-volatile flux, and a polymeric derivative obtained by polymerizing chloro-2-butadiene-1,3 in the presence of sulfur and plasticizing the polymer until it has a plasticity number of from 0 to 30.

6. A composition for molding rubber-like articles which comprises a curing accelerator, 25 to 100 parts of a non-volatile flux, and 100 parts of a polymeric derivative obtained by polymerizing chloro-2-butadiene-1,3 in the presence of sulfur and plasticizing the polymer until it has a plasticity number of from 0 to 30.

7. A composition for molding rubber-like articles which comprises a curing accelerator, 25 to 100 parts of a halogenated hydrocarbon having a melting point of between 20° C. and 153° C., and 100 parts of a polymeric derivative obtained by polymerizing chloro-2-butadiene-1,3 in the presence of sulfur and plasticizing the polymer until it has a plasticity number of from 0 to 30.

8. A composition for molding rubber-like articles which comprises a curing accelerator, 25 to 100 parts of a fatty oil, and 100 parts of a polymeric derivative obtained by polymerizing chloro-2-butadiene-1,3 in the presence of sulfur and plasticizing the polymer until it has a plasticity number of from 0 to 30.

9. A composition for molding rubber-like articles which comprises a curing accelerator, 25 to 100 parts of a mineral oil, and 100 parts of a polymeric derivative obtained by polymerizing chloro-2-butadiene-1,3 in the presence of sulfur and plasticizing the polymer until it has a plasticity number of from 0 to 30.

10. A composition for molding rubber-like articles which comprises a curing accelerator, 25 to 100 parts of a mixture of a halogenated hydrocarbon having a melting point between 20° C. and 153° C. and a fatty oil, and 100 parts of a polymeric derivative obtained by polymerizing chloro-2-butadiene-1,3 in the presence of sulfur and plasticizing the polymer until it has a plasticity number of from 0 to 30.

11. A composition for molding rubber-like articles which comprises a curing accelerator, 25 to 100 parts of a mixture of a halogenated hydrocarbon having a melting point between 20° C. and 153° C. and a mineral oil, and 100 parts of a polymeric derivative obtained by polymerizing chloro-2-butadiene-1,3 in the presence of sulfur and plasticizing the polymer until it has a plasticity number of from 0 to 30.

12. An elastic highly distensible article made by molding the composition of claim 1 and curing the same.

13. An elastic highly distensible article made by molding the composition of claim 4 and curing the same.

14. A composition for molding rubber-like articles containing a curing accelerator, a non-volatile flux consisting of an oil and a halogenated hydrocarbon, and a polymeric derivative obtained by polymerizing chloro-2-butadiene-1,3 in the presence of sulfur and plasticizing the polymer until it has a plasticity number of from 0 to 30.

15. A composition for molding rubber-like articles which contains a curing accelerator, 25 to 100 parts of a non-volatile flux consisting of a mixture of an oil and a halogenated hydrocarbon and 100 parts of a polymeric derivative obtained by polymerizing chloro-2-butadiene-1,3 in the presence of sulfur and plasticizing the polymer until it has a plasticity number of from 0 to 30.

HOWARD W. STARKWEATHER.
FRANK N. WILDER.